(No Model.)

L. H. KIMBALL.
SEEDING MACHINE.

No. 547,016. Patented Oct. 1, 1895.

Witnesses.

Inventor,
Lewis H. Kimball.
by his attorneys.

UNITED STATES PATENT OFFICE.

LEWIS H. KIMBALL, OF IOWA, JACKSON COUNTY, IOWA.

SEEDING-MACHINE.

SPECIFICATION forming part of Letters Patent No. 547,016, dated October 1, 1895.

Application filed February 27, 1895. Serial No. 539,881. (No model.)

*To all whom it may concern:*

Be it known that I, LEWIS H. KIMBALL, a citizen of the United States, residing in Iowa township, in the county of Jackson and State of Iowa, have invented certain new and useful Improvements in Seeding-Machines, of which the following is a specification.

My invention relates especially to seeding-machines of the class shown in my Patent No. 534,750, of February 26, 1895.

The object of my present invention is to provide improved seed-dropping devices so constructed that they may be adjusted to feed large or small amounts of grain or seed. The machine shown in my patent above referred to is adapted to sow grass-seed or grain either singly or together, there being different compartments in the hopper and both compartments opening into the same feed-tube. When such seed as grass-seed is sown alone, it is desirable to have a fine adjustment of the seed-dropping devices, in order that the cups or compartments may be made small to deliver small quantities of the seed at each operation.

Figure 1:
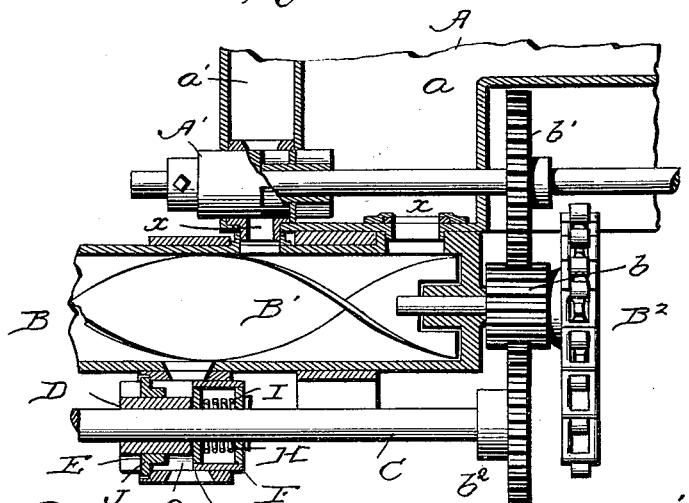
Figure 2:
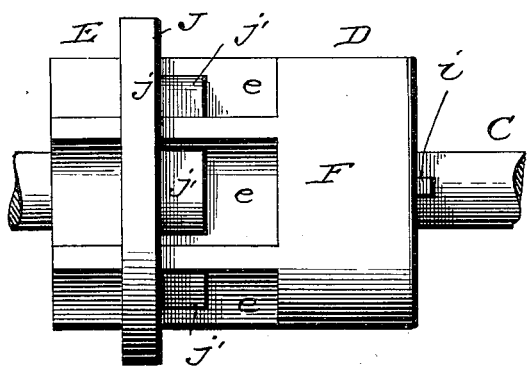
Figure 3:
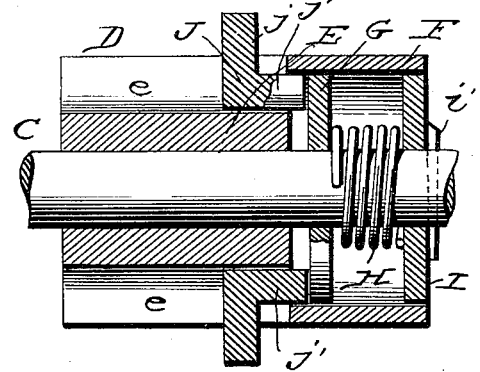
Figure 4:
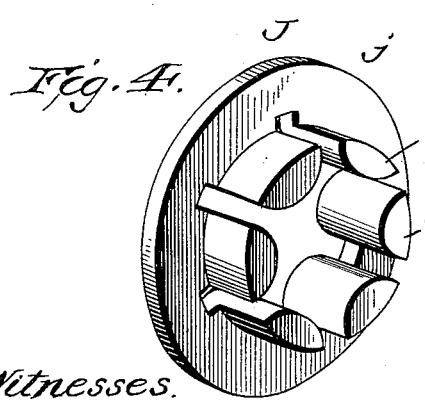
Figure 5:
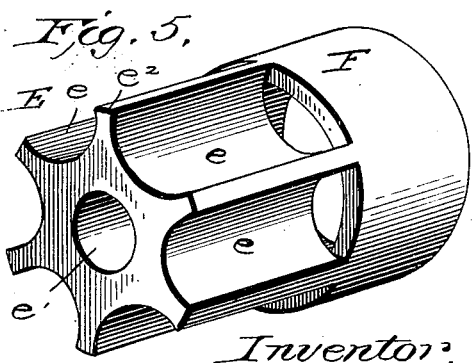

In the accompanying drawings, illustrating my invention, Figure 1 is a view in section of a portion of a hopper connected with a feed-tube which is provided with my improved seed-dropping devices. Fig. 2 is a plan view of one of the feed-rollers and its adjustable end piece. Fig. 3 is a sectional view of the same with the end piece in a different position. Fig. 4 is a perspective view of the end piece, and Fig. 5 is a perspective view of the recessed roller.

The hopper A is divided into two or more compartments. The central compartment $a$ is designed to contain grain and the end compartment $a'$ to contain grass-seed. These compartments connect by openings $x$ with a horizontal feed-tube B, each of which may be provided with a slide or gate. Preferably, however, the compartment $a'$ is provided with a rotary recessed roller A', as in my patent above referred to. Within the tube B is a screw-shaft B', driven by gearing $B^2$ and connected by a pinion $b$ with the spur-wheel $b'$ on the shaft of the roller A'. A spur-wheel $b^2$ on the shaft C also gears with the pinion $b$ and is adapted to slide thereon parallel with its axis. The shaft C is mounted in suitable bearings below the feed-tube B, and to it are secured a series of seed-dropping devices D.

The mechanism above described is essentially the same as that shown in my aforesaid patent, except the seed-dropping devices, which are of improved construction, and which are shown in detail in Figs. 2 to 5 of the drawings.

Each seed-dropping device consists of a roller E, longitudinally recessed or fluted at $e$, centrally perforated at $e'$, and provided at one end with an annular shell or casing F. The shaft C extends centrally through the casing F and through the fluted roller E. Within the casing is arranged a disk G, free to slide on the shaft C and pressed toward the end of the roller by a coiled spring H, encircling the shaft C. The spring also bears against an end piece I, which closes the end of the casing and is held in place by a key $i$. At the opposite end of the roller there is an adjustable end piece J, consisting of a ring $j$, encircling the outer ends of the webs $e^2$ of the roller E, and projections $j'$, extending laterally from the ring $j$ into the recesses $e$ and occupying a portion of the area thereof at all times.

The amount of grain fed by the roller E may be varied by adjusting the end piece J longitudinally on the roller or, which is in effect the same thing, adjusting the roller relatively to the end piece, which may be held stationary. The adjustment may be the same as that described in my aforesaid patent.

When both grain and grass-seed are fed at the same time, the end piece may be arranged in the position shown in Figs. 1 and 2; but when it is desired to sow grass-seed in smaller quantities the end piece may be adjusted to the position shown in Fig. 3, in which position, it will be observed, the projections $j'$ extend past the inner end of the casing F and force back the disk or plate G against the force of the spring H. By this means not only is the area of the recesses or cups decreased in width, but it is also diminished in depth. The disk G closes the ends of the recesses $e$ at the edge of the casing F, when the end piece J, with its projections, is moved to the left, as shown in Figs. 2 and 3, so that no seed can fall into the casing, which would otherwise be open, as shown in Fig. 5. By these devices the amount of grain or of grass-seed fed from the tube may be nicely regulated, the amount of grass-seed and grain fed to the tube being of course correspondingly regulated.

I claim as my invention—

1. The combination of the recessed or fluted roller and the adjustable end-piece on one end thereof, having lateral projections extending toward the opposite end of the roller, conforming to the contour of the recesses therein, partially filling them and closing the ends thereof.

2. The combination of the fluted or recessed roller, the end-piece having lateral projections extending into the recesses of the roller, the casing at one end of the roller, and the yielding disk or plate in the casing, against which the ends of the projections abut.

In testimony whereof I have hereunto subscribed my name.

LEWIS H. KIMBALL.

Witnesses:
  HAZEN CLARK,
  WM. J. KEEFE.